(12) United States Patent
Lee et al.

(10) Patent No.: US 9,431,636 B2
(45) Date of Patent: Aug. 30, 2016

(54) RECHARGEABLE BATTERY

(71) Applicants: Sang-Joo Lee, Yongin-si (KR); Heui-Sang Yoon, Yongin-si (KR)

(72) Inventors: Sang-Joo Lee, Yongin-si (KR); Heui-Sang Yoon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 667 days.

(21) Appl. No.: 13/670,582

(22) Filed: Nov. 7, 2012

(65) Prior Publication Data

US 2013/0344380 A1 Dec. 26, 2013

Related U.S. Application Data

(60) Provisional application No. 61/663,869, filed on Jun. 25, 2012.

(51) Int. Cl.
*H01M 2/02* (2006.01)
*H01M 10/04* (2006.01)
*H01M 10/052* (2010.01)

(52) U.S. Cl.
CPC .............. *H01M 2/02* (2013.01); *H01M 2/021* (2013.01); *H01M 2/0212* (2013.01); *H01M 2/0217* (2013.01); *H01M 2/0267* (2013.01); *H01M 2/0292* (2013.01); *H01M 10/049* (2013.01); *H01M 2/026* (2013.01); *H01M 2/0262* (2013.01); *H01M 10/052* (2013.01); *Y10T 29/49108* (2015.01)

(58) Field of Classification Search
CPC ........... H01M 2/0207; H01M 2/0217; H01M 2/0212; H01M 2/021; H01M 10/0436; H01M 2/02; H01M 2/021; H01M 2/026; H01M 2/0267; H01M 2/0262; H01M 2/0292; H01M 10/049; Y02E 60/122; Y10T 29/49108
See application file for complete search history.

(56) References Cited

U.S. PATENT DOCUMENTS

| | | | |
|---|---|---|---|
| 2007/0054180 A1 | 3/2007 | Miyajima et al. | |
| 2007/0154784 A1* | 7/2007 | Seo | 429/61 |
| 2009/0155631 A1* | 6/2009 | Baek et al. | 429/7 |
| 2010/0151281 A1* | 6/2010 | Kwag et al. | 429/7 |
| 2010/0297494 A1* | 11/2010 | Chen | 429/179 |
| 2011/0183189 A1 | 7/2011 | Kumar et al. | |
| 2013/0344360 A1 | 12/2013 | Miyajama et al. | |

FOREIGN PATENT DOCUMENTS

| | | |
|---|---|---|
| CN | 1983670 A | 9/2006 |
| DE | 10-2009-037-726 A1 | 2/2011 |

(Continued)

OTHER PUBLICATIONS

European Office action dated Jan. 12, 2015 for EP 12 193 756.9; Sang-Joo Lee, et al.

(Continued)

*Primary Examiner* — Ula C Ruddock
*Assistant Examiner* — Lisa S Park
(74) *Attorney, Agent, or Firm* — Lee & Morse, P.C.

(57) ABSTRACT

A battery includes a pouch type case formed of a flexible material and the case has a bottom with a recess portion and a protrusion portion, an electrode assembly within the case, and a support member coupled to the recess portion and to the protrusion portion at the bottom of the case. The support member fixes shapes of the recess portion and the protrusion portion, and the support member is coupled to an outside of the case at the bottom of the case.

16 Claims, 9 Drawing Sheets

(56) References Cited

FOREIGN PATENT DOCUMENTS

| | | |
|---|---|---|
| EP | 1 760 803 A1 | 3/2007 |
| EP | 1 772 914 A2 | 4/2007 |
| KR | 10-2007-0088895 A | 8/2007 |
| KR | 10-2008-0016049 A | 2/2008 |

OTHER PUBLICATIONS

Extended European Search Report dated Sep. 20, 2013.
Chinese Office action dated Jun. 22, 2016.

* cited by examiner

RECHARGEABLE BATTERY

CROSS-REFERENCE TO RELATED APPLICATION

The present application claims priority under 35 U.S.C. §119(e) to U.S. Provisional Application No. 61/663,869, filed on Jun. 25, 2012, and entitled: "Rechargeable Battery," which is incorporated herein by reference in its entirety.

BACKGROUND

Secondary batteries may be repeatedly charged and discharged. A rechargeable battery with low capacity may be used for a small portable electronic device such as a mobile phone, a laptop computer, and a camcorder. A rechargeable battery with a higher capacity may be used as a power source for driving a motor such as for a hybrid vehicle.

SUMMARY

Embodiments may be realized by providing a battery that includes a pouch type case formed of a flexible material and the case has a bottom with a recess portion and a protrusion portion, an electrode assembly within the case, and a support member coupled to the recess portion and to the protrusion portion at the bottom of the case. The support member fixes shapes of the recess portion and the protrusion portion, and the support member is coupled to an outside of the case at the bottom of the case.

The recess portion and the protrusion portion may be arranged to reduce a surplus space in the case. The bottom of the case may include a film material having a compressed region that defines the recess portion. The bottom of the case may include the protrusion portion adjacent to the recess portion. The protrusion portion may extend outwardly relative to the case. The electrode assembly may be seated on the recess portion. The electrode assembly may be above the protrusion portion, and the electrode assembly may be excluded from the protrusion portion.

The protrusion portion may be offset to one side of the bottom of the case. The recess portion may include a flattened region arranged in a central region of the bottom of the case and arranged along one side of the bottom of the case. The protrusion portion may define other sides of the bottom of the case and may be adjacent to the flattened region.

The battery may further include a buffer member on the outside of the case. The buffer member may be between the recess portion and the support member. The support member may be a tape member with an adhesive layer. The tape member may be adhered to the buffer member and to the protrusion portion. The support member may be directly adhered to the buffer member and to the protrusion portion.

The battery may further include a finishing tape on the outside of the case. The finishing tape may be between the bottom of the case and the support member. The finishing tape may cover the recess portion, the protrusion portion, and sidewalls of the case that are adjacent to the bottom of the case. The finishing tape may be fixed to the protrusion portion and at least partially surrounds the protrusion portion.

Embodiments may also be realized by providing a method of manufacturing a battery that includes arranging an electrode assembly within a pouch type case, reducing a surplus space in the case by pressing and flattening a bottom of the case to form a recess portion at the bottom of the case, and coupling a support member to an outside of the case at the bottom of the case, after pressing and flattening the bottom of the case.

Embodiments may also be realized by providing a rechargeable battery that includes an electrode assembly having a positive electrode and a negative electrode, and a case having a space for housing the electrode assembly. A protrusion is formed on at least one edge of the bottom surface of the case and a recess is formed inside the protrusion.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of elements and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 1:
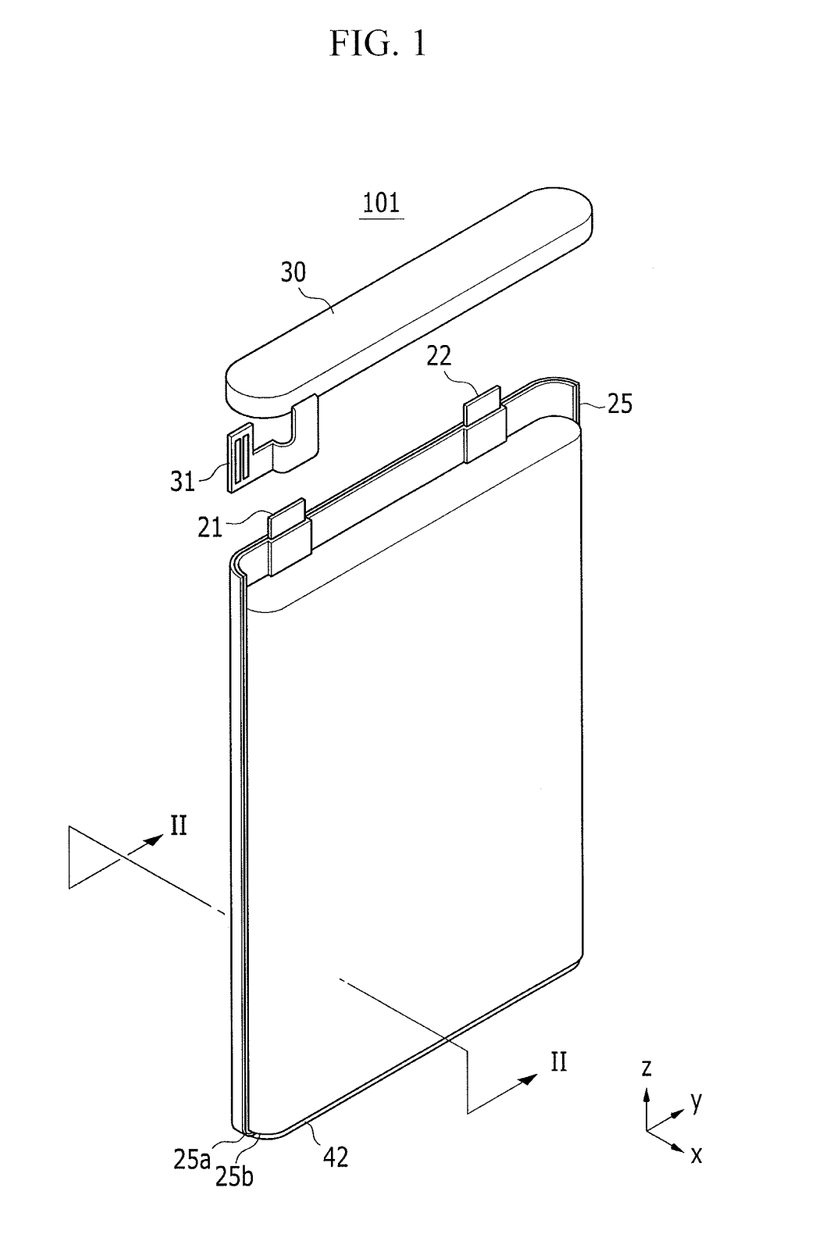
FIG. 1 illustrates an exploded perspective view of a rechargeable battery according to an exemplary embodiment.
Figure 2:
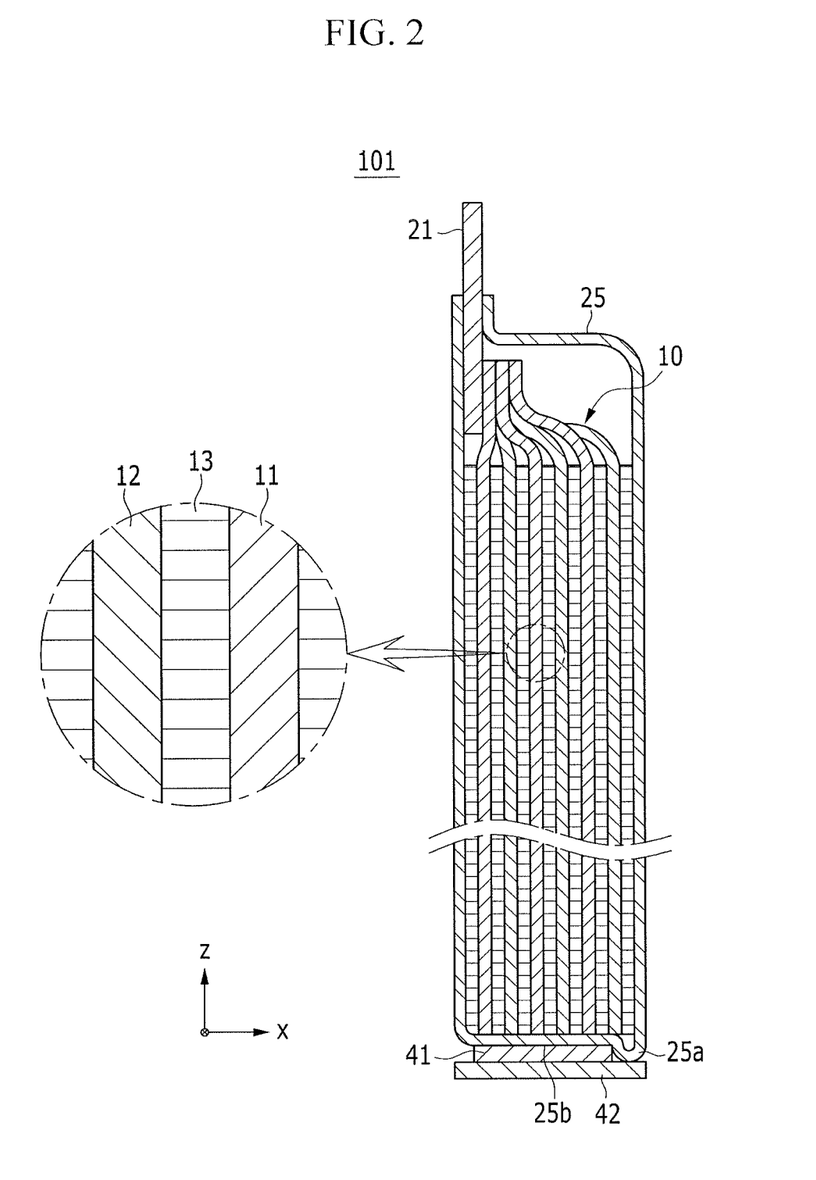
FIG. 2 illustrates a cross-sectional view of the rechargeable battery according to an exemplary embodiment.

FIG. 1 is an exploded perspective view of a rechargeable battery 101 according to a first exemplary embodiment. FIG. 2 is a cross-sectional view of the rechargeable battery 101.

Referring to FIG. 1 and FIG. 2, the rechargeable battery 101 may include an electrode assembly 10, a case 25 for housing the electrode assembly 10 therein, a protective circuit module 30 coupled to the top of the case 25, and a support member 42 coupled to the bottom of the case 25.

According to an exemplary embodiment, the rechargeable battery 101 may correspond to a lithium battery or may correspond to a lithium polymer battery.

The electrode assembly 10 may be formed by winding a positive electrode 11, a negative electrode 12, and a separator 13 interposed between the positive electrode 11 and the negative electrode 12. Alternatively, the electrode assembly 10 may be formed by stacking the positive and negative electrodes 11 and 12, with the separator 13 positioned therebetween. A positive terminal 21 may be coupled to the positive electrode 11 and a negative terminal 22 may be coupled to the negative electrode 12. The case 25 may be attached to opposing sides of each of the positive terminal 21 and the negative terminal 22 so that the electrode assembly 10 is enclosed within the case 25.

The case 25 may be formed in a flexible pouch type, e.g., the case 25 may be a flexible pouch that is moldable into difference shapes in accordance with the shape of the electrode assembly 10. The case 25 may have a surplus region after the electrode assembly 10 is inserted therein, e.g., the electrode assembly may be excluded from the surplus region. For example, the surplus region may be formed by a surplus portion of the material that forms the case 25, e.g., the surplus portion may be at the bottom of the case 25.

The case 25 may be made of, e.g., a synthetic resin film, or a laminate film formed of a synthetic resin film with a metal thin film inserted therein. Although not shown, a label and a metal cover may be further provided on the case 25

The protective circuit module 30 may be placed on the top of the case 25. The protective circuit module 30 may be coupled to the positive terminal 21 and the negative terminal 22. The protective circuit module 30 may include a circuit board having a protection element provided therein to, e.g., control the charging and discharging and other operations of the battery. An external terminal 31 may be provided on the protective circuit module 30. The external terminal 31 may extend from a lateral side of the protective circuit module 30.

The support member 42 may be placed on the bottom of the case 25 so as to oppose the protective circuit module 30. The electrode assembly 10 may be housed within the case 25 so as to be arranged, e.g., in its entirety, between the support member 42 and the protective circuit module 30. The support member 42 may be arranged so as to be parallel to the protective circuit module 30.

Figure 3:
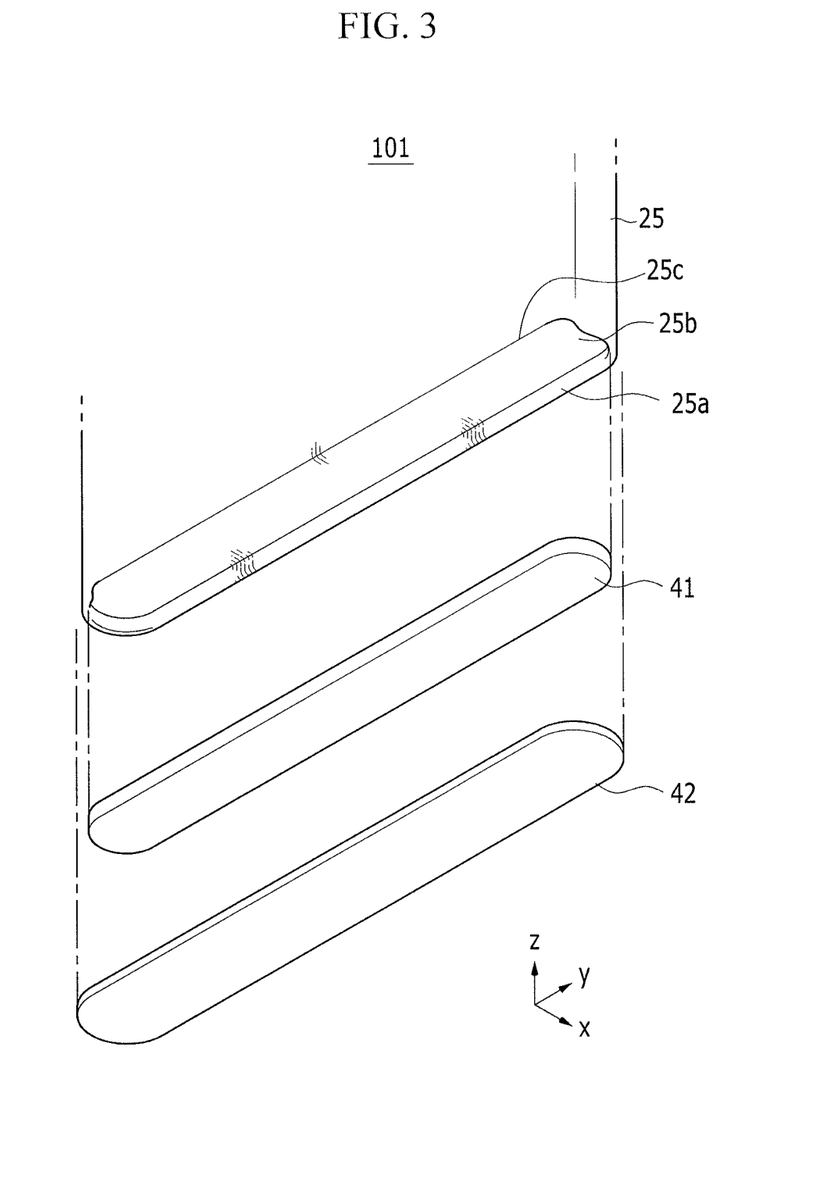
FIG. 3 illustrates an exploded perspective view of the rechargeable battery in FIG. 2, when viewed from the bottom, according to an exemplary embodiment.

FIG. 3 is an exploded perspective view of the rechargeable battery according to the first exemplary embodiment, when viewed from the bottom.

Referring to FIG. 2 and FIG. 3, a protrusion 25a and a recess 25b may be formed on the bottom surface of the case 25. The recess 25b may be positioned inside the protrusion 25a such that the protrusion 25a surrounds lateral sides of the recess 25b along the bottom surface of the case 25. The protrusion 25a is protruded downward from the bottom surface of the case 25 toward the support member 42. Accordingly, an uppermost surface of the recess 25b, which may be a substantially flat surface, may be closer to the electrode assembly than a lowermost surface of the protrusion 25a, which may be a curved surface. The protrusion 25a may extend along the bottom edge of the case 25. For example, the protrusion 25a may overlap, e.g., may be directly on, edges of the support member 42. The recess 25b may overlap a center portion of the support member 42.

The protrusion 25a may be protruded on three edges of the bottom surface of the case 25, e.g., to surround three lateral sides of the recess 25b and/or to be a continuous member extending along the three lateral sides of the recess 25b. Accordingly, an opening 25c, in which the protrusion 25a is excluded, may be formed on another edge of the bottom surface of the case 25, e.g., one lateral side of the recess 25b may not be surrounded by the protrusion 25a. The protrusion 25a may be formed by bending a film material positioned at the bottom of the case 25, e.g., the film material may correspond to the material that forms the case 25.

After arranging the electrode assembly 10 in the case 25, a surplus portion protruded in the formation of the case 25 may be positioned at the bottom of the case 25. The surplus portion may be a feature of the case 25 owed to the characteristics of the pouch-type form of the case 25 and owed to forming a flat pouch in a hexahedral shape. However, the electrode assembly 10, e.g., the positive electrode 11 and/or the negative electrode 12, may move into the space formed by the surplus portion, and thus an internal short-circuit may occur.

In contrast embodiments relate to, pressing and flattening a center region of the bottom of the case 25, at which such a surplus portion is formed. Accordingly, embodiments relate to reducing a surplus space along the bottom surface of the case 25, e.g., by shifting a surplus portion to the edges of the case 25. For example, the pressed and flattened center region of the bottom of the case 25 may be used to form the protrusion 25a on a plurality of edges along the bottom of the case 25 and the recess 25b enclosed by the protrusion 25a. Further, a compressed region, which includes the center region, may define the recess 25b.

A buffer member 41 may be adjacent to the protrusion 25a and the recess 25b. For example, the buffer member 41 may be inserted into the recess 25b. A shape of the buffer member 41 may substantially correspond to a shape of the recess 25b. The buffer member 41 may be positioned within the recess 25b so that at least one lateral side, e.g., three lateral sides, of the buffer member 41 is surrounded by and/or abuts the protrusion 25a.

The buffer member 41 may be formed in a longitudinal plate-like shape that extends in the lengthwise direction (y-axis direction of FIG. 3) of the bottom surface of the case 25. The buffer member 41 may be directly adhered to the recess 25b. The buffer member 41 may be made of a polymer that has elasticity, e.g., so as to absorb an impact. Accordingly, the buffer member 41 may be stably attached to the case 25 and may absorb an impact transferred to the case 25. According to an exemplary embodiment, the buffer member 41 may be a tape member with an adhesive layer formed on at least one surface.

The support member 42 may be attached, e.g., adhered, to a bottom of the buffer member 41, e.g., so as to be spaced apart from the recess 25b by the buffer member 41. Therefore, the support member 42 may be coupled to an outside of the case 25. The support member 42 may also be attached to the protrusion 25a. The support member 42 may be attached to a bottom surface of the buffer member 41. The support member 42 may serve to maintain the shape of the case 25, e.g., maintain the shape of the bottom surface of the case 25 in which the protrusion 25a and the recess 25b are formed. The support member 42 may reduce the possibility of and/or prevent movement of the electrode assembly 10 provided within the case 25. According to an exemplary embodiment, the support member 42 may be a tape member with an adhesive layer formed on one surface.

By providing the buffer member 41 in the recess 25b and providing the support member 42, the electrode assembly 10 may be prevented from moving, which movement may occur due to the surplus portion at the bottom of the case 25. Accordingly, the possibility of an internal short-circuiting caused by the movement of the electrode assembly 10 may be reduced and/or prevented. Further, the buffer member 41 may absorb an external impact or vibration.

Figure 4:
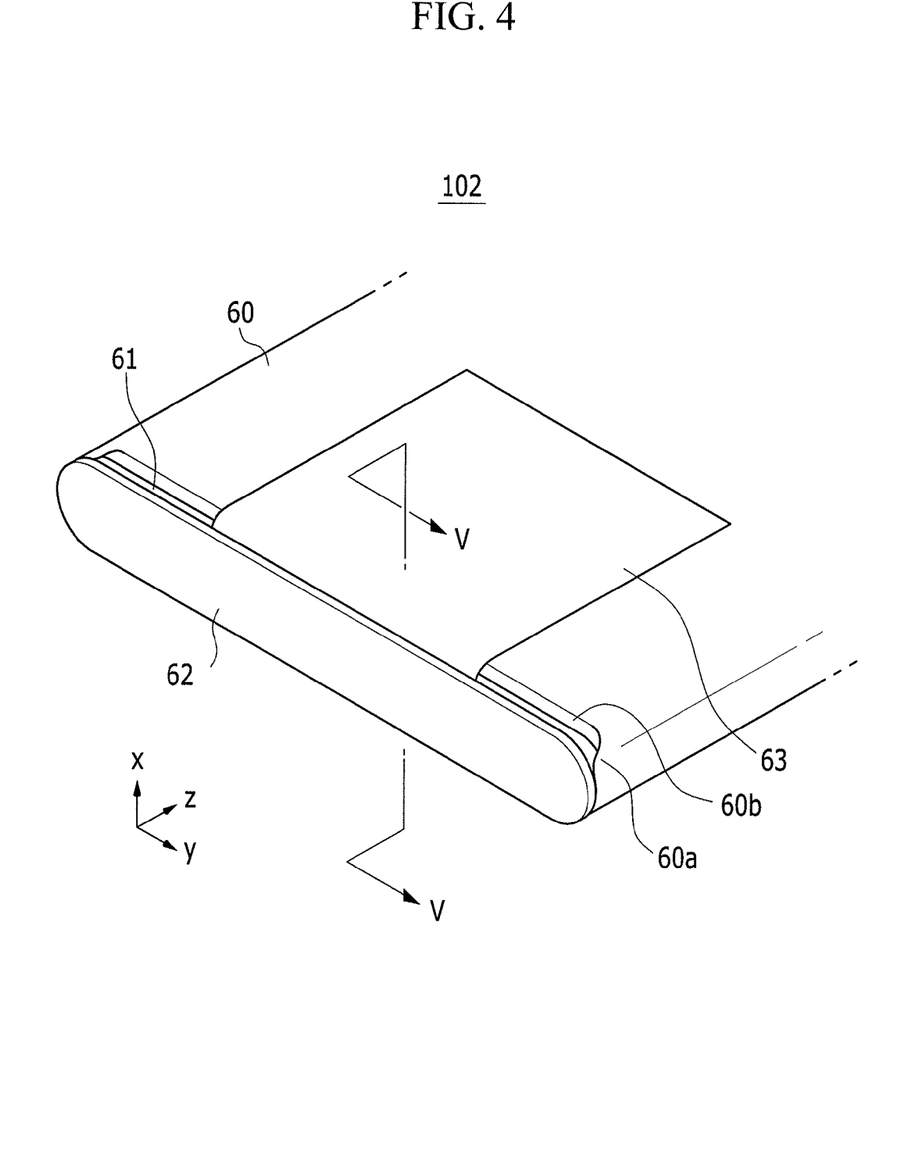
FIG. 4 illustrates a perspective view illustrating a part of a rechargeable battery according to an exemplary embodiment.
Figure 5:
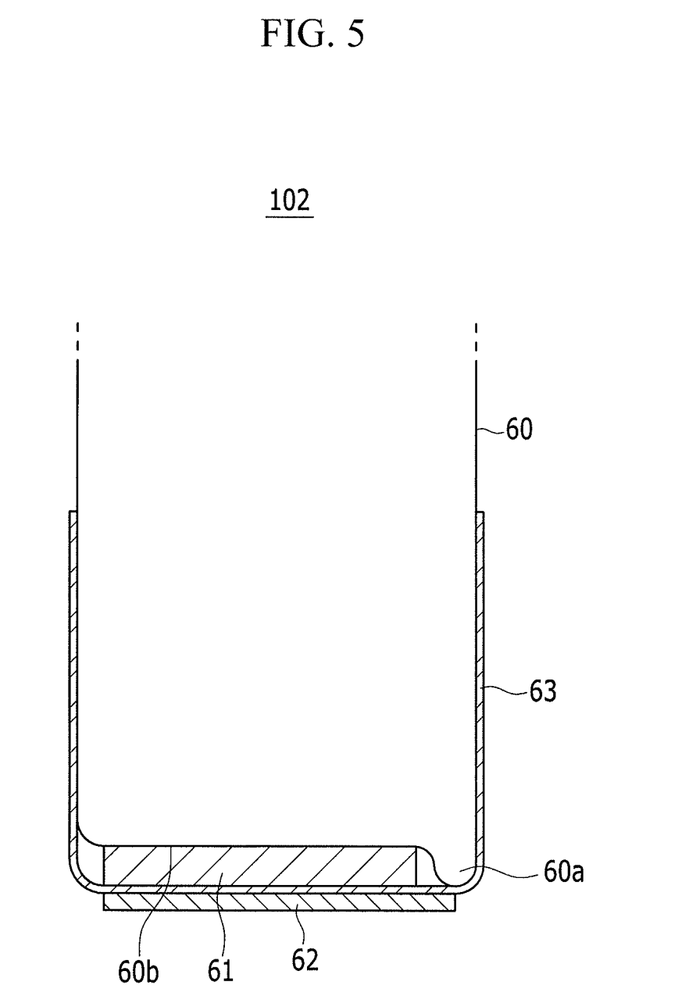
FIG. 5 illustrates a cross-sectional view of the rechargeable battery in FIG. 4, according to an exemplary embodiment.

FIG. 4 is a perspective view illustrating a part of a rechargeable battery 102 according to a second exemplary embodiment. FIG. 5 is a cross-sectional view of the rechargeable battery 102.

Referring to FIG. 4 and FIG. 5, the rechargeable battery 102 may include an electrode assembly (not shown) that is the same as and/or similar to the electrode assembly 10 shown in FIG. 2. The electrode assembly may be housed within a case 60, and the case 60 may be formed for housing the electrode assembly. The case 60 may be the same as and/or similar to the case 25. The case 60 may, similar to the case 25, have a protective circuit module (not shown) coupled to a top thereof and a support member 62 coupled to a bottom thereof. The support member 62 may be the same and and/or similar to the support member 42.

The rechargeable battery 102 may have a similar structure as the rechargeable battery 101, except for a support structure provided at the bottom of the case 60 may be varied. Thus, repetitive description of the same structures will be omitted.

The case 60 may be formed as a flexible pouch type case. For example, the case 60 may be made of a synthetic resin film, or a laminate film formed of a synthetic resin film with a metal thin film inserted therein.

A protrusion 60a and a recess 60b positioned inside the protrusion 60a may be formed on the bottom surface of the case 60.

The protrusion 60a may protrude downward from the case 60, e.g., toward the support member 62. The protrusion 60a may extend along the bottom corner of the case 60, e.g., the protrusion 60a may surround at least one lateral side of the recess 60b. For example, the protrusion 60a may protrude on three edges of the bottom surface of the case 60, and an opening with no protrusion may be formed on another edge of the bottom surface of the case 60.

Similar to the protrusion 25a and the recess 25b, the protrusion 60a and the recess 60b may be formed by pressing and flattening a center region of the bottom of the case 60. For example, the protrusion 60a may be formed by bending a film material positioned at the bottom of the case 60. Forming the protrusion 60a may include pressing and flattening the center of the bottom so that a surplus portion at the bottom of the case 60 is shifted to edges of the bottom of the case 60. Further, the recess 60b may be formed inside the protrusion 60a.

A buffer member 61 may be inserted into the recess 60b. The buffer member 61 may be attached to the recess 60b. Lateral sides of the buffer member 61 may be surrounded by the protrusion 60a. The buffer member 61 may be formed in a longitudinal plate-like shape which extends in the lengthwise direction (y-axis direction of FIG. 4) of the bottom surface of the case 60. The buffer member 61 may be made of polymer which has elasticity so as to absorb an impact. Therefore, the buffer member 61 may be stably attached to the case 60 and may absorb an impact transferred to the case 60. According to an exemplary embodiment, the buffer member 61 may be a tape member with an adhesive layer formed on at least one surface.

A finishing tape 63 may be attached to the bottom of the buffer member 61 to be on, e.g., attached to, opposing side surfaces and the bottom surface of the case 60. For example, the finishing tape 63 may be attached to both of the side surfaces, e.g., long surfaces, of the case 60 while partially surrounding a center portion of the buffer member 61, thereby stably fixing the buffer member 61. The finishing tape 63 may also be attached to a portion of the protrusion 60a, e.g., only a center portion of the protrusion 60a along one edge of the bottom of the case 60.

The support member 62 may be provided on the bottom of the finishing tape 63 so that the finishing tape 63 is between the center portion of the buffer member 61 and a center portion of the support member 62. Therefore, the support member 62 may be coupled to an outside of the case 60. The support member 62 may be arranged directly under the buffer member 61 in side regions of the bottom of the case 60 where the finishing tape 63 is excluded. The support member 62 may be directly under the finishing tape 63 in a center portion of the bottom of the case 60 where the finishing tape 63 is included. Both the protrusion 60a and the recess 60b may overlap the support member 62.

The support member 62 may be attached to the bottom surfaces of the finishing tape 63 and buffer member 61. The support member 62 may serve to maintain the shape of the case 60, e.g., maintain the shape of the bottom surface of the case 60 in which the protrusion 60a and the recess 60b are formed. The support member 62 may reduce the possibility of and/or prevent the movement of the electrode assembly 10 provided within the case 60. According to an exemplary embodiment, the support member 62 may be a tape with an adhesive layer formed on one surface.

Figure 6:
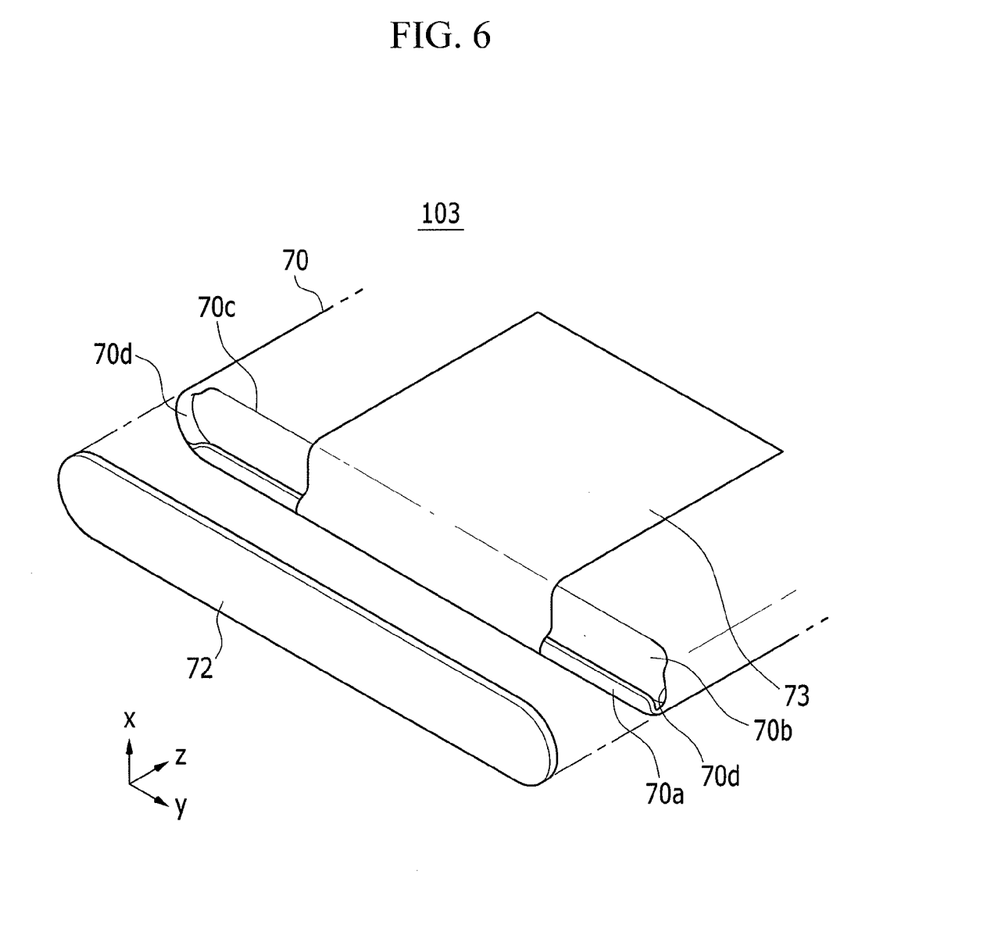
FIG. 6 illustrates an exploded perspective view illustrating a part of a rechargeable battery according to an exemplary embodiment.
Figure 7:
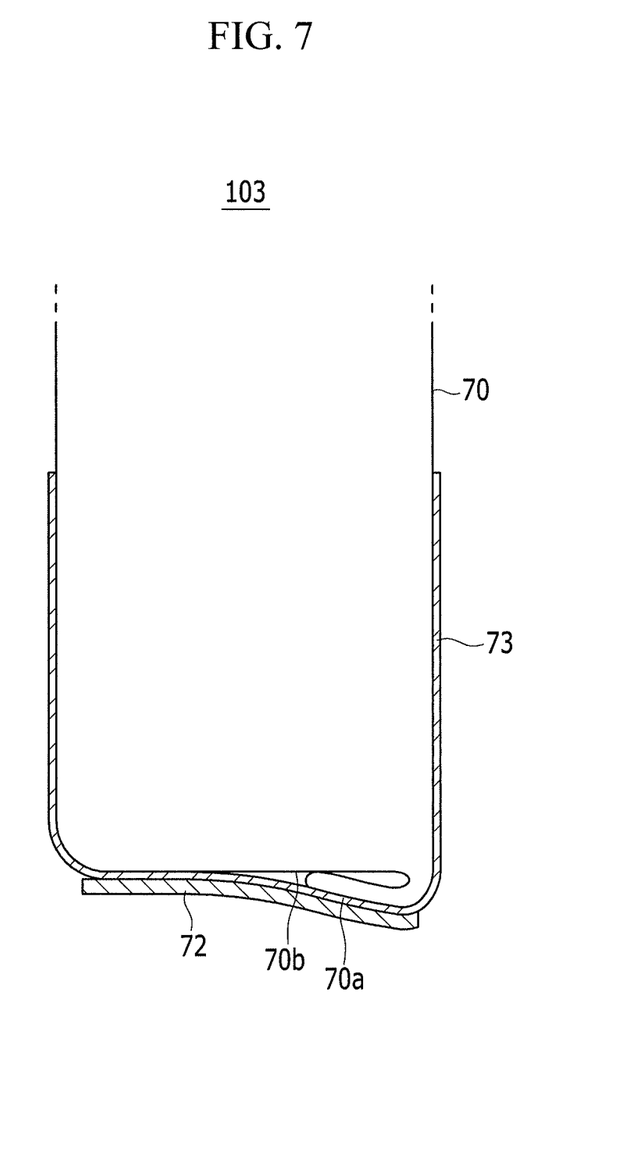
FIG. 7 illustrates a cross-sectional view of the rechargeable battery in FIG. 6, according to an exemplary embodiment.

FIG. 6 is an exploded perspective view illustrating a part of a rechargeable battery 103 according to a third exemplary embodiment. FIG. 7 is a cross-sectional view of the rechargeable battery 103.

Referring to FIG. 6 and FIG. 7, the rechargeable battery 103 may include an electrode assembly (not shown) that is the same as and/or similar to the electrode assembly 10 shown in FIG. 2. The electrode assembly may be housed within a case 70, and the case 70 may be formed for housing the electrode assembly. The case 70, similar to the case 25 and 60, may have a protective circuit module coupled to a top thereof and a support member 72 coupled to a bottom thereof.

The rechargeable battery 103 may have a similar structure as the rechargeable battery 101, except for a support structure provided at the bottom of the case 70 may be varied. Thus, repetitive description of the same structure will be omitted.

The case 70 may be formed in a flexible pouch type. For example, the case 70 may be made of a synthetic resin film, or a laminate film formed of a synthetic resin film with a metal thin film inserted therein.

A protrusion and a recess 70b positioned inside the protrusion may be formed on the bottom surface of the case 70. The protrusion includes a first protrusion 70a formed by being bent from the bottom surface of the case 70, e.g., the first protrusion 70a may be folded over along one side of the case 70 so that a portion of the first protrusion 70a overlaps the recess 70b. For example, the first protrusion 70a may be offset to one side of the bottom of the case such that a majority of the surplus portion of the bottom surface of the case 70 is offset to that one side of the case. The protrusion may further include a second protrusion 70d extending from opposing longitudinal ends of the first protrusion 70a, e.g., so as to extend along other sides of the case 70, and protruding downward. The second protrusion 70d may not be folded over similar to the first protrusion 70a, e.g., the second protrusion 70d may have a curved shape similar to the protrusion 25a.

According to an exemplary embodiment, the bottom surface of the case 70 may have an approximately rectangular shape. The first protrusion 70a may be formed on the lengthwise (y-axis directional) edge of the bottom surface of the case 70. The second protrusion 70d may be formed on at least one of the widthwise (x-axis directional) edges of the bottom surface of the case 70. Also, an opening 70c, along which no protrusion is formed, may be formed on one edge of the bottom surface of the case 70. The opening 70c may be on an edge of the bottom surface of the case 70 that opposes the lengthwise edge along which the first protrusion 70a is formed.

The first protrusion 70a and the second protrusion 70d may be formed by a method that includes pressing and flattening a region of the case 70. For example, forming the first protrusion 70a may further include bending a film material positioned at the bottom of the case 70. By pressing, e.g., pushing, and bending a surplus portion positioned at the bottom of the case 70 in the widthwise direction of the bottom surface, a protruding portion may be formed on one edge. By bending the protruding portion, the first protrusion 70a is formed to have a folded over shape. The second protrusion 70d may be formed so as to be connected to both side ends of the first protrusion 70a, by pushing the surplus portion in both lengthwise directions of the bottom surface during the formation of the first protrusion 70a. During the process, a recess 70b may be formed inside the first and second protrusions 70a and 70d.

After the first protrusion 70a is formed, a finishing tape 73 may be attached to surround opposing side surfaces and the bottom surface of the case 70. The finishing tape 73 may be attached to the opposing the side surfaces of the case 70 while partially surrounding the first protrusion 70a. The finishing tape 73 may be fixed so that the first protrusion 70a is kept bent and/or folded over.

The support member 72 may be provided on the bottom of the finishing tape 73. Therefore, the support member 72 may be coupled to an outside of the case 70. The support member 72 may be a tape member with an adhesive layer formed on one surface. The support member 72 may be attached to the bottom surfaces of the finishing tape 73 and case 70. The support member may overlap the folded over portion of the first protrusion 70a. The support member 72 may serve to maintain the shape of the case 70, e.g., maintain the shape of the bottom surface of the case 70 in which the first protrusion 70a, the recess 70b, and the second protrusion 70d are formed. The support member 72 may reduce the possibility of and/or prevent movement of the electrode assembly provided within the case 70. The support member 72 may be a flexible member, e.g., a tape member, so as to conform to the shape of the bottom surface of the case 70 having the first protrusion 70a.

Once the bent first protrusion 70a is formed, a surplus space may be shifted. Then, the finishing tape 73 and the support member 72 may be sequentially provided, which may reduce the possibility of and/or prevent the movement of the electrode assembly within the case 70.

Figure 8:
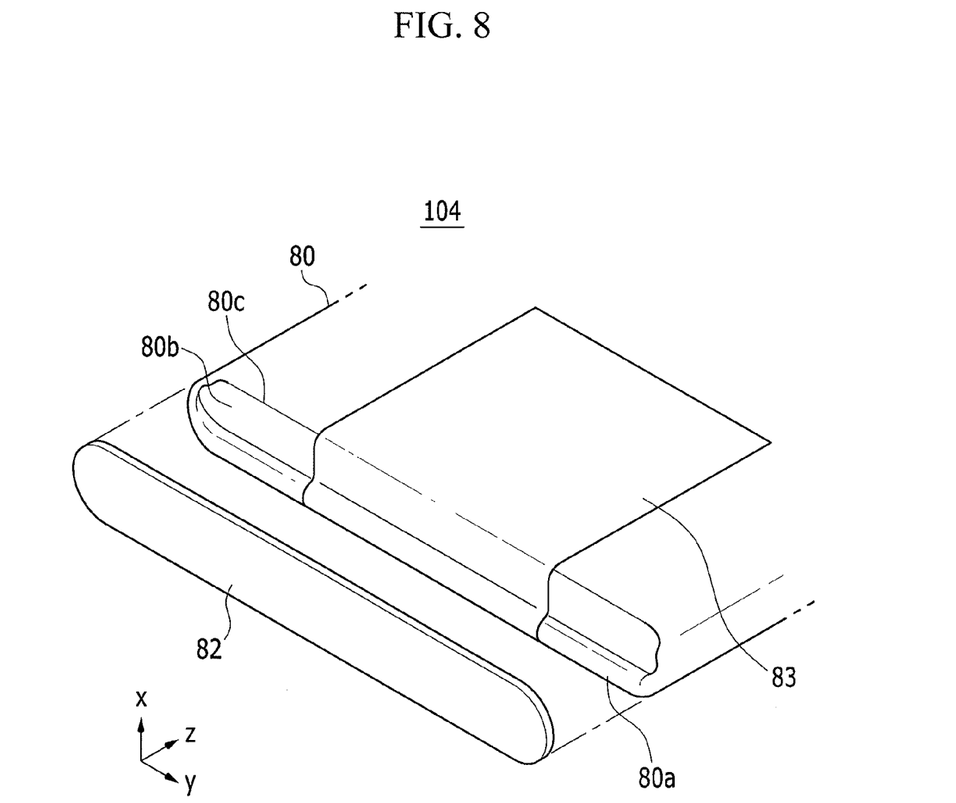
FIG. 8 illustrates an exploded perspective view illustrating a part of a rechargeable battery according to an exemplary embodiment.
Figure 9:
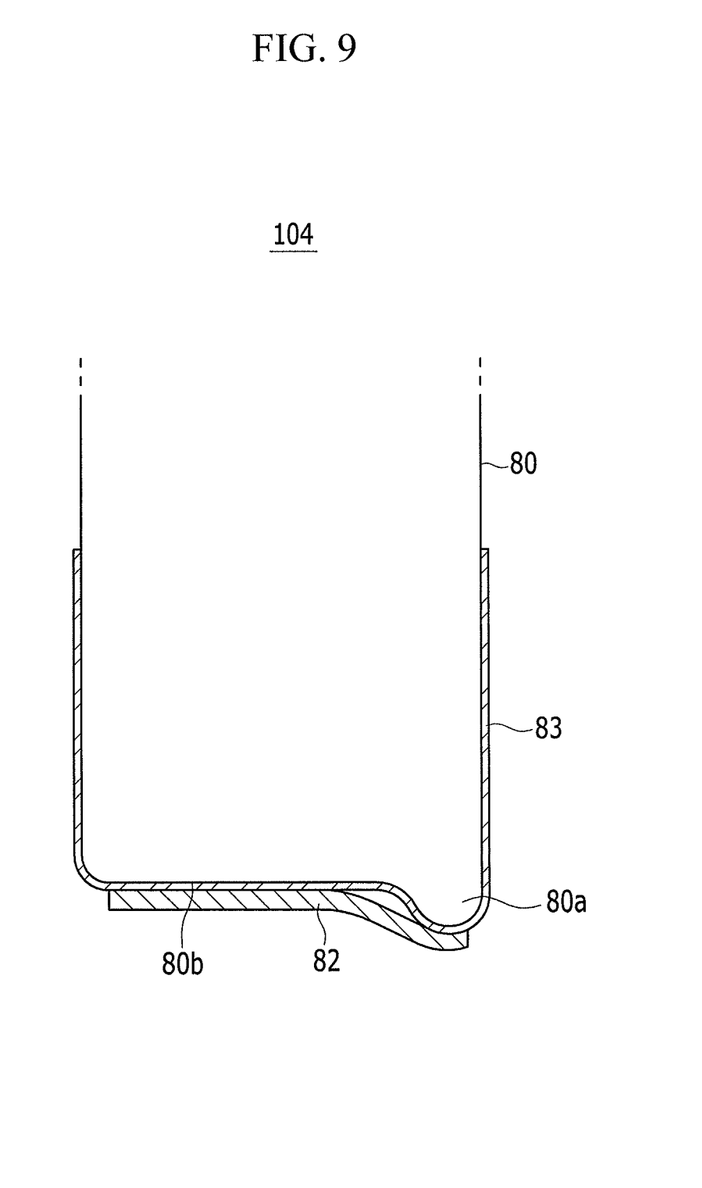
FIG. 9 illustrates a cross-sectional view of the rechargeable battery in FIG. 8, according to an exemplary embodiment.

FIG. 8 is an exploded perspective view illustrating a part of a rechargeable battery 104 according to a third exemplary embodiment. FIG. 9 is a cross-sectional view of the rechargeable battery 104.

Referring to FIG. 8 and FIG. 9, the rechargeable battery 104 may include an electrode assembly (not shown) that is the same as and/or similar to the electrode assembly 10 shown in FIG. 2. The electrode assembly may be housed within a case 80, and the case 80 may be formed for housing the electrode assembly. The case 80 may be the same as and/or similar to the case 25. The case 80 may, similar to the case 25, have a protective circuit module coupled to a top of the case 80, and a support member 82 coupled to a bottom of the case 80.

The rechargeable battery 104 may have a similar structure as the rechargeable battery 101, except for a support structure provided at the bottom of the case 80 may be varied. Thus, repetitive description of the same structure will be omitted.

The case 80 may be formed as a flexible pouch type case. The case 80 may be made of a synthetic resin film, or a laminate film formed of a synthetic resin film with a metal thin film inserted therein.

A protrusion 80a and a recess 80b positioned inside the protrusion 80a are formed on the bottom surface of the case 80. The protrusion 80a may be protruded downward from the case 80, and may extend along the bottom edge of the case 80. The protrusion 80a may be protruded from three edges of the bottom surface of the case 80, and an opening 80c with no protrusion may be formed on one edge of the bottom surface of the case 80.

Similar to the protrusion 25a and the recess 25b, the protrusion 80a and the recess 80b may be formed by pressing and flattening a center region of the bottom of the case 80. The protrusion 80a may be formed by bending a film material positioned at the bottom of the case 80. By pressing and flattening the center of the bottom at which a surplus portion is formed, the protrusion 80a may be formed, and the recess 80b may be formed inside the protrusion 80a.

With the protrusion 80a being formed, a finishing tape 83 may be attached to surround opposing side surfaces and the bottom surface of the case 80. The finishing tape 83 is attached to both of the side surfaces of the case 80 while partially surrounding the protrusion 80a, thereby maintaining the shape of the protrusion 80a and the recess 80b.

The support member 82 may be provided on the bottom of the finishing tape 83. Therefore, the support member 82 may be coupled to an outside of the case 80. The support member 82 may be a tape member with an adhesive layer formed on one surface. The support member 82 may be attached to the bottom surfaces of the finishing tape 83 and case 80. The support member 82 may serve to maintain the shape of the case 80, e.g., maintain the shape of the bottom surface of the case 80 in which the protrusion 80a and the recess 80b are formed. The support member 82 may reduce the possibility of and/or prevent the movement of the electrode assembly provided within the case 80.

By way of summation and review, secondary batteries, or rechargeable batteries, may use lithium-based oxides as positive active materials and carbon materials as negative active materials. Secondary batteries may be classified into, e.g., a liquid electrolyte battery and a polymer electrolyte battery according to the type of electrolyte. A battery using a liquid electrolyte may be referred to as a lithium ion battery and a battery using a polymer electrolyte may be referred to as a polymer battery.

The battery may also include a pouch-type case and an electrode assembly inserted into the case. The electrode assembly may include a separator interposed between a negative electrode and a positive electrode. Without the features of the embodiments disclosed herein, the negative electrode and/or the positive electrode of the electrode assembly may move, e.g., when the battery falls, which may in turn result in a short-circuit between the positive electrode and the negative electrode.

In contrast, embodiments relate to a rechargeable battery and to a rechargeable battery having a lower support structure. Embodiments also relate to providing a rechargeable battery that has a protective circuit module, which may be stably bonded to a case. For example, the case having a space for housing an electrode assembly, and a protrusion is formed on at least one edge of the bottom surface of the case and a recess is formed inside the protrusion. The protrusion, which may be formed by bending the case, and the recess may reduce the possibility of and/or prevent an internal short circuit caused by the movement of the electrode assembly from occurring. The protrusion formed by bending the case and the recess, which is formed inside the protrusion, may contribute to preventing an internal short-circuit caused by the movement of the electrode assembly within the case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery, comprising:
a case formed of a moldable material in a form of a pouch, the case having a bottom portion including a recess portion and a protrusion portion;
an electrode assembly within the case, the electrode assembly having a bottom surface on the bottom portion of the case; and
a support member to support the bottom portion of the case and to fix shapes of the recess portion and the protrusion portion of the bottom portion of the case, the support member having a top surface on the bottom portion of the case, the top surface extending along the bottom surface of the electrode assembly, wherein
the recess portion and the protrusion portion of the bottom portion of the case are arranged along the bottom surface of the electrode assembly and are between the bottom surface of the electrode assembly and the top surface of the support member.

2. The battery as claimed in claim 1, wherein the recess portion and the protrusion portion are formed by pressing the bottom portion of the case such that a surplus space in the case is reduced.

3. The battery as claimed in claim 1, wherein the bottom portion of the case includes a film material having a compressed region that defines the recess portion.

4. The battery as claimed in claim 1, wherein the bottom portion of the case includes the protrusion portion adjacent to the recess portion, the protrusion portion extending outwardly relative to the case.

5. The battery as claimed in claim 1, wherein the protrusion portion is offset to one side of the bottom portion of the case.

6. The battery as claimed in claim 1, wherein the recess portion includes a flattened region arranged in a central region of the bottom portion of the case and arranged along one side of the bottom portion of the case.

7. The battery as claimed in claim 6, wherein the protrusion portion defines other sides of the bottom portion of the case and is adjacent to the flattened region.

8. The battery as claimed in claim 1, further comprising a buffer member being between the recess portion of the bottom portion of the case and the top surface of the support member and being surrounded the protrusion portion of the bottom portion of the case.

9. The battery as claimed in claim 8, wherein the support member is a tape member with an adhesive layer, the tape member being adhered to the buffer member and to the protrusion portion.

10. The battery as claimed in claim 8, wherein the support member is directly adhered to the buffer member and to the protrusion portion.

11. The battery as claimed in claim 1, further comprising a finishing tape on the outside of the case, the finishing tape being between the bottom portion of the case and the support member.

12. The battery as claimed in claim 11, wherein the finishing tape covers the recess portion, the protrusion portion, and sidewalls of the case that are adjacent to the bottom portion of the case.

13. The battery as claimed in claim 11, wherein the finishing tape is fixed to the protrusion portion and at least partially surrounds the protrusion portion.

14. The battery as claimed in claim 1, wherein:
the electrode assembly is seated on the recess portion, and
the electrode assembly is above the protrusion portion, and the electrode assembly is excluded from the protrusion portion.

15. A method of manufacturing a battery, the method comprising:
arranging an electrode assembly within a case in a form of a pouch, the electrode assembly having a bottom surface on a bottom portion of the case;
pressing and flattening the bottom portion of the case to form a recess portion and a protrusion portion at the bottom portion of the case such that a surplus space in the case is reduced; and
providing a support member having a top surface on the bottom portion of the case, the top surface extending along the bottom surface of the electrode assembly, after pressing and flattening the bottom portion of the case, the support member to support the bottom portion of the case, wherein
the recess portion and the protrusion portion at the bottom portion of the case are arranged along the bottom surface of the electrode assembly and are between the bottom surface of the electrode assembly and the top surface of the support member.

16. The battery as claimed in claim 1, wherein the bottom surface of the electrode assembly and the top surface of the support member face each other.

* * * * *